United States Patent
Thillaiyan et al.

(10) Patent No.: US 9,455,447 B2
(45) Date of Patent: Sep. 27, 2016

(54) LITHIUM-SULFUR BATTERY AND METHODS OF PREVENTING INSOLUBLE SOLID LITHIUM-POLYSULFIDE DEPOSITION

(71) Applicant: EAGLEPICHER TECHNOLOGIES, LLC, Joplin, MO (US)

(72) Inventors: Ramanathan Thillaiyan, Joplin, MO (US); Wujun Fu, Joplin, MO (US); Mario Destephen, Joplin, MO (US); Greg Miller, Diamond, MO (US); Ernest Ndzebet, Carl Junction, MO (US); Umamaheswari Janakiraman, Webb City, MO (US)

(73) Assignee: EAGLEPICHER TECHNOLOGIES, LLC, Joplin, MO (US)

( * ) Notice: Subject to any disclaimer, the term of this patent is extended or adjusted under 35 U.S.C. 154(b) by 312 days.

(21) Appl. No.: 14/038,337

(22) Filed: Sep. 26, 2013

(65) Prior Publication Data

US 2015/0084604 A1    Mar. 26, 2015

(51) Int. Cl.
*H01M 4/62* (2006.01)
*H01M 10/058* (2010.01)
(Continued)

(52) U.S. Cl.
CPC ........... *H01M 4/628* (2013.01); *H01M 2/1673* (2013.01); *H01M 10/052* (2013.01); *H01M 10/058* (2013.01); *H01M 10/0568* (2013.01); *H01M 10/0569* (2013.01); *H02J 7/0052* (2013.01); *H01M 4/13* (2013.01); *H01M 4/382* (2013.01); *H01M 4/5815* (2013.01);
(Continued)

(58) Field of Classification Search
CPC .... H01M 4/628; H01M 4/04; H01M 4/5815; H01M 10/058; H02J 7/0052; H02J 7/00
USPC .................. 320/162; 429/326–330, 332, 334, 429/336–340, 342, 343, 231.4, 623.1
See application file for complete search history.

(56) References Cited

U.S. PATENT DOCUMENTS

| | | |
|---|---|---|
| 3,336,145 A | 8/1967 | Purcell |
| 4,874,682 A | 10/1989 | Scott et al. |

(Continued)

FOREIGN PATENT DOCUMENTS

| | | |
|---|---|---|
| EP | 1 714 339 B1 | 1/2012 |
| EP | 2 421 081 A1 | 2/2012 |

(Continued)

OTHER PUBLICATIONS

Su et al., "A new approach to improve cycle performance of rechargeable lithium-sulfur batteries by inserting a free-standing MWCNT interlayer," Chem. Commun., 2012, 48, 8817-8819.

(Continued)

*Primary Examiner* — Edward Tso
*Assistant Examiner* — Dung V Bui
(74) *Attorney, Agent, or Firm* — Kenealy Vaidya LLP

(57) ABSTRACT

An improved lithium-sulfur battery containing a surface-functionalized carbonaceous material. The presence of the surface-functionalized carbonaceous material generates weak chemical bonds between the functional groups of the surface-functionalized carbonaceous material and the functional groups of the polysulfides, which prevents the polysulfide migration to the battery anode, thereby providing a battery with relatively high energy density and good partial discharge efficiency.

36 Claims, 6 Drawing Sheets

(51) Int. Cl.
*H01M 4/58* (2010.01)
*H02J 7/00* (2006.01)
*H01M 4/04* (2006.01)
*H01M 2/16* (2006.01)
*H01M 10/052* (2010.01)
*H01M 10/0568* (2010.01)
*H01M 10/0569* (2010.01)
*H01M 4/13* (2010.01)
*H01M 4/38* (2006.01)

(52) U.S. Cl.
CPC .......... *Y02E60/122* (2013.01); *Y02T 10/7011* (2013.01); *Y10T 29/49108* (2015.01)

(56) References Cited

U.S. PATENT DOCUMENTS

| | | | | |
|---|---|---|---|---|
| 5,093,216 | A * | 3/1992 | Azuma | C04B 35/528 252/182.1 |
| 5,114,811 | A | 5/1992 | Ebel et al. | |
| 5,407,500 | A | 4/1995 | Forsberg et al. | |
| 5,869,208 | A * | 2/1999 | Miyasaka | H01M 4/131 429/215 |
| 6,030,720 | A | 2/2000 | Chu et al. | |
| 6,060,184 | A | 5/2000 | Gan et al. | |
| 6,316,144 | B1 * | 11/2001 | Xue | H01M 4/133 423/275 |
| 6,677,077 | B2 * | 1/2004 | Spillman | H01M 6/103 429/163 |
| 8,252,461 | B2 | 8/2012 | Vu et al. | |
| 2002/0045101 | A1 | 4/2002 | Hwang et al. | |
| 2002/0192557 | A1 | 12/2002 | Choi et al. | |
| 2003/0073005 | A1 | 4/2003 | Kim et al. | |
| 2004/0009393 | A1 | 1/2004 | Kim et al. | |
| 2004/0048164 | A1 | 3/2004 | Jung et al. | |
| 2005/0042503 | A1 | 2/2005 | Kim et al. | |
| 2005/0053842 | A1 | 3/2005 | Ryu et al. | |
| 2005/0089758 | A1 | 4/2005 | Kim et al. | |
| 2005/0221184 | A1 * | 10/2005 | Naruto | H01M 4/133 429/231.8 |
| 2006/0257726 | A1 * | 11/2006 | Kelley | H01M 2/18 429/142 |
| 2007/0082264 | A1 | 4/2007 | Mikhaylik | |
| 2009/0155695 | A1 | 6/2009 | Noh | |
| 2009/0226809 | A1 | 9/2009 | Vu et al. | |
| 2009/0286163 | A1 * | 11/2009 | Shin | H01M 4/5815 429/315 |
| 2010/0221616 | A1 | 9/2010 | Chang et al. | |
| 2010/0310907 | A1 | 12/2010 | Miller et al. | |
| 2010/0310908 | A1 * | 12/2010 | Zhang | H01M 4/364 429/90 |
| 2010/0327811 | A1 | 12/2010 | Affinito et al. | |
| 2011/0104526 | A1 * | 5/2011 | Boxley | H01M 2/1646 429/50 |
| 2011/0165466 | A1 * | 7/2011 | Zhamu | B82Y 30/00 429/231.8 |
| 2011/0171510 | A1 * | 7/2011 | Suzuki | C22C 24/00 429/101 |
| 2011/0287305 | A1 | 11/2011 | Scordilis-Kelley et al. | |
| 2012/0021403 | A1 | 1/2012 | Laderoute et al. | |
| 2012/0074746 | A1 | 3/2012 | Guo et al. | |
| 2012/0082890 | A1 * | 4/2012 | Dong | H01G 9/038 429/188 |
| 2013/0001089 | A1 * | 1/2013 | Li | B82Y 40/00 205/106 |
| 2013/0045427 | A1 * | 2/2013 | Zhamu | H01M 4/38 429/403 |
| 2013/0059193 | A1 | 3/2013 | Scordilis-Kelley et al. | |
| 2013/0065127 | A1 * | 3/2013 | Nazar | H01M 4/5815 429/218.1 |
| 2013/0065137 | A1 | 3/2013 | Ndzebet et al. | |
| 2013/0099170 | A1 | 4/2013 | Zaldivar et al. | |
| 2013/0141050 | A1 * | 6/2013 | Visco | H01M 8/188 320/130 |
| 2013/0143096 | A1 | 6/2013 | Affinito et al. | |
| 2013/0183588 | A1 * | 7/2013 | Oh | H01M 4/505 429/231.95 |
| 2013/0196208 | A1 | 8/2013 | Nemoto | |
| 2013/0244094 | A1 * | 9/2013 | Giroud | H01M 2/0257 429/185 |

FOREIGN PATENT DOCUMENTS

WO  WO 2010/102239     9/2010
WO  WO 2011/147924 A1  1/2011

OTHER PUBLICATIONS

Zu et al., "Improved lithium-sulfur cells with a treated carbon paper interlayer," Phys. Chem. Chem. Phys., 2013, 15, 2291-2297.

Xiong et al., "Properties of surface film on lithium anode with LiNO3 as lithium salt in electrolyte solution for lithium-sulfur batteries," Electrochimica Acta 83, 78-86, 2012.

Zhang, "Role of LiNO3 in rechargeable lithium/sulfur battery," Electrochimica Acta 70, 344-348, 2012.

Fernandes et al., "Functionalization of Carbon Nanofibers by a Diels-Alder Addition Reaction," J. Nanosci. Nanotechnol. vol. 7, No. 10, 2007.

* cited by examiner

LITHIUM-SULFUR BATTERY AND METHODS OF PREVENTING INSOLUBLE SOLID LITHIUM-POLYSULFIDE DEPOSITION

GOVERNMENT SUPPORT

This invention was made with Government support under HR0011-12-C-0122 awarded by DARPA. The Government has certain rights in the invention.

TECHNICAL FIELD

The present disclosure generally relates to battery technology. More particularly, the disclosure relates to lithium-sulfur batteries including surface-functionalized carbonaceous materials, and to methods of forming and using the batteries.

BACKGROUND

As lighter, smaller portable electronic devices with increasing functionality are developed, there is generally a corresponding increasing demand for smaller, lighter batteries with increased energy density to power the devices. Such batteries can be used in commercial applications, such as portable notebooks and computers, digital and cellular phones, personal digital assistants, and the like, and higher energy applications, such as hybrid and electric cars, and military or defense applications.

Lithium-sulfur batteries have been developed to address some of these concerns. Lithium-sulfur batteries are rechargeable, have a relatively high energy density and specific power, are relatively light, can operate over a wide temperature range, use relatively inexpensive cathode materials (such as, for example, sulfur), and are relatively safe for the environment, compared to other battery technologies such as nickel metal hydride (NiMH), lithium ion, nickel cadmium (Ni—Cd), and lead acid batteries.

Lithium-sulfur batteries generally include a lithium anode, an electrolyte, a porous separator, and a sulfur cathode. In a discharge operation of the battery, the lithium anode is oxidized to form lithium ions, while the sulfur cathode is reduced to form polysulfides, which are soluble products. During a charging operation, polysulfides are oxidized to form solid sulfur.

Unfortunately, with conventional lithium-sulfur batteries, the sulfur cathode discharge products, polysulfides, may migrate through the separator and react on a surface of the anode, causing further performance and capacity degradation.

Various attempts have been made to address these issues with conventional lithium-sulfur batteries. Known electrolytes fail to adequately attenuate the interaction of polysulfide with the surface of the anode, and protective lithium anode layers have other undesirable effects on the electrochemical characteristics of the battery. Accordingly, improved lithium-sulfur batteries and components thereof are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure provides an improved lithium-sulfur battery, an electrolyte for a lithium-sulfur battery, and methods of forming the lithium-sulfur battery. In general, the batteries of the present disclosure exhibit increased energy density and specific energy, compared to traditional lithium-sulfur batteries. In addition, the batteries are relatively safe compared to other battery technologies.

In some embodiments, the present disclosure relates to a non-aqueous lithium-sulfur electrochemical cell that includes an anode including an anode material comprising lithium; a cathode including a cathode material comprising sulfur; a separator disposed between the anode and the cathode; a non-aqueous electrolyte which is in fluid communication with the anode, the cathode, and the separator; and a layer containing a surface-functionalized carbonaceous material disposed between the anode and the cathode.

In some embodiments, the present disclosure relates to a method of charging a lithium-sulfur electrochemical cell, including supplying electrical energy to the lithium-sulfur electrochemical cell at a constant current; monitoring the voltage during charging; and terminating the charge when the monitored voltage is in a range of about 2.4 volts to about 3.0 volts, where the lithium-sulfur electrochemical cell includes an anode including an anode material comprising lithium; a cathode including a cathode material comprising sulfur; a separator disposed between the anode and the cathode; a non-aqueous electrolyte which is in fluid communication with the anode, the cathode, and the separator; and a layer containing a surface-functionalized carbonaceous material disposed between the anode and the cathode, wherein functional groups of the surface-functionalized carbonaceous material interact with functional groups of polysulfides and slow the rate of migration of the polysulfides.

In some embodiments, the present disclosure relates to a method of charging a lithium-sulfur electrochemical cell, including supplying electrical energy to the lithium-sulfur electrochemical cell at a constant current; monitoring the voltage during charging; and terminating the charge when the monitored voltage is in a range of about 2.4 volts to about 3.0 volts, where the lithium-sulfur electrochemical cell includes an anode including an anode material comprising lithium; a cathode including a cathode material comprising sulfur; a separator disposed between the anode and the cathode; a non-aqueous electrolyte which is in fluid communication with the anode, the cathode, and the separator; and a layer containing a surface-functionalized carbonaceous material disposed between the anode and the cathode. The functional groups of the surface-functionalized carbonaceous material interact with functional groups of polysulfides and slow or prevent the rate of migration of the polysulfides.

BRIEF DESCRIPTION OF THE DRAWINGS

The manner in which the objectives of the present disclosure and other desirable characteristics may be obtained is explained in the following description and attached drawings in which.

DETAILED DESCRIPTION OF THE EMBODIMENTS

Figure 1:
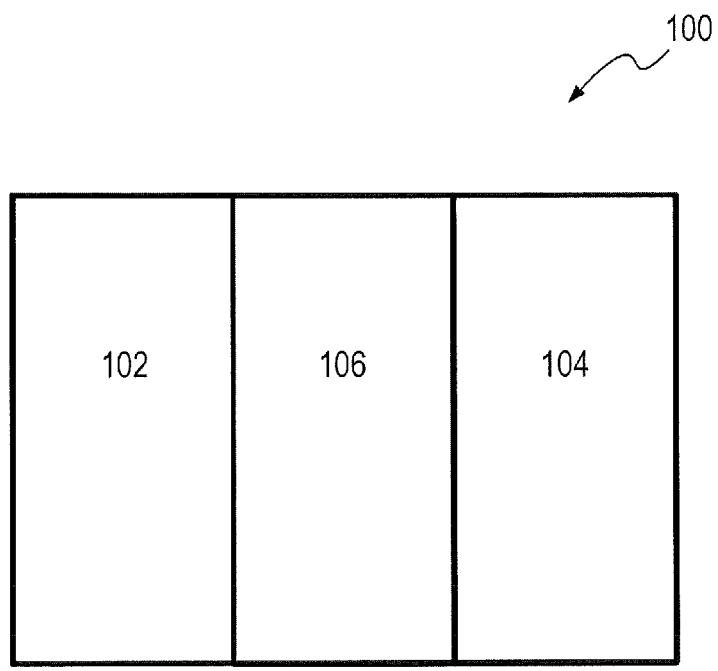
FIG. 1 illustrates a lithium-sulfur electrochemical cell (or battery) in accordance with various embodiments of the present disclosure.

In the following description, numerous details are set forth to provide an understanding of the present disclosure. However, it may be understood by those skilled in the art that the methods of the present disclosure may be practiced without these details and that numerous variations or modifications from the described embodiments may be possible.

When introducing elements of the present disclosure or the embodiments thereof, the articles "a", "an", "the" and "said" are intended to mean that there are one or more of the elements. The terms "comprising", "including" and "having" are intended to be inclusive and mean that there may be additional elements other than the listed elements.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

In embodiments, the present disclosure relates to a lithium-sulfur battery or lithium-sulfur electrochemical cell including an anode comprising lithium, a cathode comprising sulfur, a strontium additive and/or a separator comprising a surface-functionalized carbonaceous material, and an electrolyte. In other embodiments, the surface-functionalized carbonaceous material of the lithium-sulfur battery or lithium-sulfur electrochemical cell may be a layer or a sheet that is included in a location other than or in addition to the separator.

In embodiments, the strontium additive, such as $SrI_2$ (which may be soluble in the electrolyte), may react with lithium sulfide and/or lower order lithium polysulfides, which are commonly present in a solid form in lithium-sulfur (LiS) batteries (or LiS electrochemical cells) after the battery is discharged, to form soluble one or more $SrS_x$ species, where x is an integer in the range of from 1 to about 8, such as 1 to about 6, or 1 to about 4. Unlike, lithium sulfide and/or lithium polysulfide, the one or more $SrS_x$ species readily dissolve in the electrolyte and are available for further electrochemical redox processes.

In embodiments, the surface-functionalized carbonaceous materials may operate to reduce the diffusion of polysulfides toward the anode, for example, by the uptake of the polysulfide into the surface-functionalized carbonaceous material, such as a surface-functionalized carbonaceous material functionalized with amine and/or amide groups that selectively associate with the functional groups of the polysulfide. This further reduces the diffusion of the polysulfides that might otherwise migrate (e.g., via the "polysulfide shuttle") to the lithium-comprising-anode and passivate the lithium-comprising-anode. For example, in lithium-sulfur electrochemical cells, during the charging process, sulfide ions or low chain polysulfides are oxidized at the cathode to higher polysulfides, which are soluble in the electrolyte. These higher polysulfides diffuse to the anode where they are reduced to lower polysulfides, which in turn diffuse back to the cathode to be reoxidized. This redox shuttle ("polysulfide shuttle") causes a continuous current flow in the cell, resulting in a reduction of the cell's storage capacity and a lowered charge-discharge efficiency. A similar redox process occurs during self-discharge. In embodiments, the surface-functionalized carbonaceous material (such as carbonaceous materials functionalized on the surface with amine, and/or amide groups) essentially precludes and/or inactivates the shuttle in lithium-sulfur electrochemical cells, which results in much higher charge-discharge efficiencies.

The term "charge-discharge efficiency" as used herein, represents the ratio of capacity obtained on discharge divided by the capacity supplied in the prior charge step. In other words, charge-discharge efficiency, $C_{eff}=D_{n+1}/C_n*100\%$, where D is discharge capacity, C is charge capacity and n is the cycle number. The presence of the surface-functionalized carbonaceous material (such as carbonaceous materials functionalized on the surface with amine, and/or amide groups) of the present disclosure (optionally in combination with the strontium additives of the present disclosure) increases the charge-discharge efficiency of lithium-sulfur electrochemical cells.

In embodiments, the present disclosure also relates to methods of forming an electrochemical cell or battery by inserting a strontium additive and/or a separator comprising a surface-functionalized carbonaceous material (such as a surface-functionalized carbonaceous material, such as a porous surface-functionalized carbonaceous material that is functionalized with amine, and/or amide groups) between the anode and the cathode.

In some embodiments, the methods of the present disclosure include forming an electrochemical cell or battery by inserting the surface-functionalized carbonaceous material as a sheet between the anode and the cathode in a location other than, or in addition to, the separator. In embodiments, a sheet of the surface-functionalized carbonaceous material may be inserted between the anode and the cathode, such as between the anode and the separator and/or between the separator and the cathode. In further embodiments, a sheet of the surface-functionalized carbonaceous material may be inserted between the separator and the cathode, such as at a predetermined distance from the cathode that is smaller than the distance from the sheet to the separator.

In some embodiments, the methods of the present disclosure include forming a battery by providing an anode comprising lithium; preparing a cathode comprising sulfur by providing a substrate; preparing a mixture including a solvent, a binder, sulfur, and electrically conductive material, such as carbon, to form a slurry; coating the slurry onto the substrate; allowing the solvent to evaporate; and forming a separator including a strontium additive and/or a surface-functionalized carbonaceous material (such as a surface-functionalized carbonaceous material functionalized with amine, and/or amide groups) interposed between the anode and the cathode.

In some embodiments, the methods of the present disclosure include forming a battery by forming a cathode comprising sulfur by providing a substrate; preparing a mixture including a solvent, a binder, sulfur, and electrically conductive material, such as a carbon, to form a slurry; coating the slurry onto the substrate; allowing the solvent to evaporate, and forming a separator, including a strontium additive and/or a surface-functionalized carbonaceous material (such as a surface-functionalized carbonaceous material functionalized with amine, and/or amide groups), on at least a portion of the cathode.

As used herein, the terms "anode" and "cathode" are used to describe the respective electrodes in a discharge or use operation of the battery or electrochemical cell. Batteries in accordance with various embodiments of the present disclosure may also include current collectors, terminals, and encasings, which are not illustrated. Batteries may be of any size or shape and may comprise one or more electrochemical cells according to the present disclosure.

In the present disclosure, an electrochemical cell may otherwise be referred to herein as a battery, a capacitor, a cell, an electrochemical device, or the like. It should be understood that any cell that involves electron transfer between an electrode and an electrolyte is contemplated to be within the scope of the term electrochemical cell as used in the present disclosure. The electrochemical cells of the present disclosure may be made in a variety of sizes and configurations in any desirable manner known to those skilled in the art.

In embodiments, the reaction of lithium sulfide and/or lithium polysulfide with the strontium additive (and the formation of soluble $SrS_x$ species) attenuates and/or eliminates solid lithium sulfide deposition in the battery or electrochemical cell, such as on a lithium metal anode surface (or the surface of the cathode), and protects the lithium-sulfur battery or electrochemical cell from performance degradation via undesired solid deposition (e.g., deposition of lithium sulfide and/or lithium polysulfide).

Thus, unlike conventional LiS batteries where undesired solids (such as lithium sulfide and/or lithium polysulfide) accumulate and the electrolyte may be "dried-up" (such as before reaching about 15 to about 20 cycles) in the LiS batteries or electrochemical cells of the present disclosure, lithium sulfide and/or lithium polysulfide growth is attenuated and/or eliminated (for example on the anode surface during cycling), and premature electrolyte "dry-up" is avoided for at least about 30 cycles, such as avoiding premature electrolyte "dry-up" for at least about 50 cycles, or avoiding premature electrolyte "dry-up" for at least about 100 cycles. In some embodiments, premature electrolyte "dry-up" may be avoided for at least about 30 cycles to about 200 cycles, such as avoiding premature electrolyte "dry-up" for at least about 50 cycles to about 150, or avoiding premature electrolyte "dry-up" for at least about 70 cycles to about 120 cycles.

The strontium additive and/or the surface-functionalized carbonaceous material (such as a surface-functionalized carbonaceous material functionalized with amine, and/or amide groups) of the present disclosure is generally suitable for use in any non-aqueous lithium-sulfur battery (or electrochemical cell) known in the art.

Additionally, such a battery or electrochemical cell that includes the strontium additive and/or the surface-functionalized carbonaceous material (such as a surface-functionalized carbonaceous material functionalized with amine, and/or amide groups) is generally suitable for a number of known applications or devices, including for example: medical devices (such as pace makers, defibrillators, cardiac monitors, drug delivery systems, pain management systems, etc.), portable military electronic devices (such as radios, transponders, weapon sights, etc.), marine devices (such as sonobuoys, torpedoes, etc.), aerospace devices (such as deep space probes, command destruct systems, back-up power systems, etc.), military and commercial sensors, remote data collection systems, among other known applications and devices. Likewise, the lithium-sulfur batteries (and components thereof) of the present disclosure can be used in a variety of applications in which primary or secondary batteries are used, such as, for example, automotive, transportation, personal safety, security, remote monitoring, law enforcement, utilities, metering, military and aerospace applications.

In embodiments, the lithium-sulfur batteries and electrochemical cells may exhibit improved properties in part because the strontium additive reacts with lithium sulfide and/or lithium polysulfide components (generated during the use of the battery or electrochemical cell) to create soluble strontium sulfides or soluble strontium polysulfides. Thus, less passivation due to solid lithium sulfide and/or lithium polysulfide component occurs (for example on the surface of the anode and/or cathode). Therefore, higher performance (compared to conventional lithium-sulfur batteries—i.e., batteries without the strontium additive of the present disclosure) of the lithium-sulfur battery or electrochemical cell of the present disclosure is achieved. As set forth in more detail below, the batteries or electrochemical cells of the present disclosure may have a higher specific energy, a higher energy density, a better cycle life efficiency, a better discharge performance, and/or a longer shelf life compared to traditional lithium-sulfur batteries.

Methods of the present disclosure may include improving or enhancing one or more of the above-mentioned performance properties of a non-aqueous lithium-sulfur electrochemical cell by using an anode comprising lithium, a cathode comprising sulfur, an optional separator, and an electrolyte comprising a strontium additive. "Improved" or "enhanced" performance properties generally refers to an improvement or enhancement in the specific energy, the cycle life efficiency, the energy density, the operating voltage, and/or the rate capability of a non-aqueous electrochemical cell, as compared, for example, to a non-aqueous electrochemical cell that is similarly prepared or designed but lacks the strontium additive as detailed herein.

As used herein, "non-aqueous" refers to an electrochemical cell (or battery) that comprises or utilizes organic solvents and inorganic or organic salts as the electrolyte. In embodiments, there is no added water to the electrochemical cell (or batteries) of the present disclosure. That is, water may not be added to the electrolyte as a separate or distinct component thereof. In some embodiments, water may be present as a trace or underlying component or contaminant of the organic solvent(s) used to prepare the electrolyte. For example, in some embodiments, the electrolyte may have a water content of less than about 1000 ppm, or a water content of less than about 250 ppm, or a water content of less than about 5 ppm.

FIG. 1 illustrates a cross-section of a battery 100 in accordance with various embodiments of the present disclosure. Battery 100 includes an anode 102, a cathode 104, an ion conductor (not illustrated), an electrolyte (not illustrated) and an optionally a separator 106. In some embodiments, one or more separators, such as two, three, four, or more separators may be used in the batteries and/or cells of the present disclosure. During a discharge operation of the battery 100, lithium anode 102 is oxidized to form lithium ions, while the sulfur cathode is reduced to form polysulfides, which are soluble products. During a charging operation, polysulfides are oxidized to form solid sulfur, while the lithium ions are plated back to the anode.

In such LiS batteries, lithium sulfide or lithium polysulfide (i.e., the solid phase of the sulfur reaction product) may accumulate on the cathode and/or anode. The strontium additive may react with the generated lithium sulfide or lithium polysulfide and may effectively eliminate the solid build-up (of lithium sulfide or lithium polysulfide) either the anode and/or the cathode. The reaction of the strontium additive (which may be soluble in the electrolyte) may generate one or more soluble $SrS_x$ compounds (where x is an integer in the range of from 1 to about 8, such as 1 to about 6, or 1 to about 4) that is soluble in the electrolyte and effective to participate in redox processes in the electrochemical cell or battery.

In embodiments, the strontium additive, may be included in one or more of the above components, such as the electrolyte and/or the one or more separators, may serve to improve the performance of the battery by reacting with a deleterious sulfide component, such as a lithium sulfide and/or lithium polysulfide component.

As a result, the lithium-sulfur battery (or lithium-sulfur cell) has a longer service life (such as a service live that is at least 20% longer, or a service live that is in a range of from about 20% longer to about 60% longer, or a service live that is in a range of from about 40% longer to about 50% longer) compared to conventional lithium-sulfur battery (or lithium-sulfur cells) that lack the strontium additive and/or the surface-functionalized carbonaceous materials. In addition, an amount of deleterious solid lithium sulfide components, such as solid lithium polysulfides, that might otherwise degrade the performance of the battery is significantly reduced.

In some embodiments, a battery of the present disclosure includes an anode containing lithium, a cathode containing sulfur, an electrolyte, and a separator, where the electrolyte and/or the separator include a strontium compound. In some embodiments, the separator may further comprise a polymer, and inorganic additives, such as clays or organically modified clays.

In some embodiments, the separator may comprise surface-functionalized carbonaceous materials that are functionalized with chemical moieties (such as amines and/or amides) that are able to generate weak bonds, such as non-covalent bonds (for example, hydrogen bonding and van der Waals forces) with polysulfides to slow down and/or stop the polysulfide migration towards the anode. Such chemical moieties (such as amines and/or amides) used to functionalize the carbonaceous materials may have a high affinity via non-covalent interactions (for example, hydrogen bonding and van der Waals forces) for the polysulfides such that the polysulfides are either adsorbed or absorbed at one or more sites in the surface-functionalized carbonaceous materials. Absorption refers to a process in which polysulfides move from the surrounding bulk phase (for example, an electrolyte) into the surface-functionalized carbonaceous material, which may be a surface-functionalized carbonaceous material that is porous. Adsorption refers to a process in polysulfides move from a bulk phase (for example, an electrolyte) onto a surface of the surface-functionalized carbonaceous material, which may be a surface-functionalized carbonaceous material that is porous.

In embodiments, the surface-functionalized carbonaceous materials may be functionalized with a high concentration of chemical moieties (such as amines and/or amides) whose properties are tailored to match the functionality of the polysulfides and thereby allow for the surface-functionalized carbonaceous materials to achieve the desired trapping/diffusion/release rates of the polysulfides from the surface-functionalized carbonaceous materials such that effectively slows down or prevents polysulfide migration towards the anode. In embodiments, the surface-functionalized carbonaceous materials may be functionalized with one or more functional groups, such as, for example, to enhance the uptake level and/or modulate the absorption/release kinetics of the polysulfides from the surface-functionalized carbonaceous materials, or the pores thereof.

In embodiments, the surface-functionalized carbonaceous material is functionalized in an amount such that the chemical moieties make up from 1 to 30% by weight of the surface-functionalized carbonaceous material, or from 5 to 15% by weight of the surface-functionalized carbonaceous material.

In some embodiments, the surface-functionalized carbonaceous material may be a sheet or layer that is provided at a location other than the separator in the battery according to the present disclosure. The sheet or layer of surface-functionalized carbonaceous material may be prepared according to known methods for preparing surface-functionalized carbonaceous materials.

The term "uptake" refers, for example, to a absorption/adsorption process resulting in the association of a polysulfide with a surface-functionalized carbonaceous material, such as surface-functionalized carbonaceous material tailored to selectively associate with the functional groups of the polysulfide. In embodiments, the uptake of the polysulfide into the surface-functionalized carbonaceous material, such as a surface-functionalized carbonaceous material functionalized with amine and/or amide groups that selectively associate with the functional groups of the polysulfide, may be reversible under predetermined conditions, such as elevated temperature conditions, but not sufficiently reversible that the migration/diffusion of polysulfide components toward the anode is not mitigated and/or completely prevented.

In embodiments, anode 102 may comprise lithium as an active material, for example, a lithium metal, lithium ions, and/or one or more lithium-based materials, such as lithium alloys, for example, lithium aluminum alloys, LiAl, LiAlMg, lithium silicon alloys, lithium tin alloys, LiMg, LiSi, LiB and LiSiB. In some embodiments, the anode may further comprise other active anode materials, such as one or more metals selected from the group consisting of magnesium, sodium, potassium. Additional materials suitable for anode 102 include lithium carbon, Li—$Sn_2O_3$, Li—Al, Li—Mg and Li—$SnO_2$ based materials. Such materials may be in any suitable form, such as, for example, foils, pressed-powder sheets, or combinations thereof. The anode 102 may also include an embedded current collector, not illustrated.

In some embodiments, the anode 102 includes lithium, lithium alloy, and/or a lithium-based anode active material, for example, in the form of a foil, such as a lithium metal foil or a lithium alloy foil. Anode 102 may optionally include one or more strontium additives. In addition, anode 102 may optionally include a protective separator attached thereto (for example, a separator containing surface-functionalized carbonaceous materials that are porous and able to generate a weak chemical bond between functional groups thereof and a polysulfide, which slows down or prevents the further migration of the polysulfide toward the anode) that allows lithium ions to migrate from anode 102 to an ion conductor and back to anode 102, respectively, during discharging and charging of the battery.

In embodiments, cathode 104 includes sulfur or, a sulfur-based material as an active material. Cathode 104 may also include a binder, electrically conductive additives, such as carbon black and graphite, and/or one or more strontium additives. In some embodiments, the cathode may additionally include a substrate (such as, an aluminum substrate) and the sulfur, binder, and conductive additives (and optional strontium additives) may form a layer or coating over the substrate.

Binders suitable for use with the cathode include a polymeric binder, such as polytetrafluoroethylene (PTFE) or polyvinylidene fluoride (PVDF); and exemplary conductive materials include carbon black, synthetic graphite including expanded graphite, graphite nanosheets, graphite nanoplatelet, graphene sheets, functionalized graphene sheets, non-synthetic graphite (including natural graphite and coke), activated carbon, carbon nanotube, graphite oxide and graphitized carbon nano-fibers.

In some embodiments, cathode 104 includes a polymeric material and/or a surface-functionalized carbonaceous material (such as a surface-functionalized carbonaceous material functionalized with amine, and/or amide groups). The polymeric material and/or a surface-functionalized carbonaceous material may react with sulfur discharge products to form even less-soluble complexes. Exemplary polymeric materials include nitrogen-based compounds that have an affinity for sulfur soluble species and that bind to at least one sulfur discharge product. One group of compounds suitable for such polymeric material includes polyamides. Exemplary surface-functionalized carbonaceous materials may include carbonaceous materials that have been functionalized with a nitrogen-containing functional group, such as an amide or amine that has an affinity for sulfur-soluble species and is capable of binding to at least one sulfur discharge product. An amount of polymeric material and/or a surface-functionalized carbonaceous material may vary in accordance with specific applications. In some embodiments, the polymeric material and/or a surface-functionalized carbonaceous material may be present in an amount of about 0.001% to about 30%, or about 0.25% to about 20%, or about 1 to about 10% by weight of the sulfur in the cathode.

In embodiments, a cathode may be prepared with the above-mentioned cathode materials in an average loading amount of from about 0.1 to 80 mg/$cm^2$, or from 0.5 to 50 mg/$cm^2$, or from 1 to 40 mg/$cm^2$, or from 2 to 30 mg/$cm^2$ of a surface of a substrate onto which the cathode material is loaded.

In embodiments, the strontium additives may be selected from strontium compounds that are generally compatible with materials typically used in the manufacture of batteries. In some embodiments, the strontium compounds may be selected from strontium halides, strontium carbonates, strontium hydroxides, strontium nitrates, strontium oxalates, strontium sulfates, strontium hydrogenphosphates, and/or hydrates of the aforementioned compounds. For example, suitable strontium compounds include, for example, $SrI_2$, $SrI_2.6H_2O$, $SrBr_2$, $SrBr_2.6H_2O$, $SrCl_2$, $SrCl_2.6H_2O$, $SrF_2$, $SrOH_2$, $SrOH_2.6H_2O$, $SrCO_3$, $SrHPO_4$, $Sr(NO_3)_2$, $SrC_2O_4$, $SrI_2$, $SrSO_4$, and mixtures thereof.

In some embodiments, solid strontium additive, such as in any desirable powder form, may be either added to an electrolyte (in which it is soluble), or dissolved and/or dispersed in a different solvent before it is introduced into the electrolyte. In some embodiments, strontium additives for use in the methods, electrochemical cells and batteries of the present disclosure may include strontium salts that have any desirable electrolyte solubility, such as an electrolyte solubility in the range of from about 1 mg/mL to about 200 mg/mL measured at room temperature, such as in the range of from about 2 mg/mL to about 100 mg/mL measured at room temperature, or in the range of from about 5 mg/mL to about 80 mg/mL measured at room temperature. In some embodiments, the strontium salt may have an electrolyte solubility of at least 1 mg/mL measured at room temperature, such as an electrolyte solubility of at least 50 mg/mL measured at room temperature, or an electrolyte solubility of at least 90 mg/mL measured at room temperature (i.e., a temperature in the range of from 20-25° C.).

Any suitable inorganic or organic acid may be used for making salts discussed in the present disclosure (such as strontium salts, and/or lithium salts). For example, such inorganic acids may be selected from the group consisting of boric acid, bromous acid, chloric acid, diphosphoric acid, disulfuric acid, dithionic acid, dithionous acid, fulminic acid, hydrazoic acid, hydrobromic acid, hydrofluoric acid, hydroiodic acid, hydrogen sulfide, hypophosphoric acid, hypophosphorous acid, iodic acid, iodous acid, metaboric acid, metaphosphoric acid, metaphosphorous acid, metasilicic acid, nitrous acid, orthophosphoric acid, orthophosphorous acid, orthosilicic acid, phosphoric acid, phosphinic acid, phosphonic acid, pyrophosphorous acid, selenic acid, sulfonic acid, thiocyanic acid and thiosulfuric acid. Suitable organic acid for making such salts may be selected from the group consisting of $C_2H_5COOH$, $C_3H_7COOH$, $C_4H_9COOH$, $(COOH)_2$, $CH(COOH)_2$, $C_2H_4(COOH)_2$, $C_3H_6(COOH)_2$, $C_4H_8(COOH)_2$, $C_5H_{10}(COOH)_2$, fumaric acid, maleic acid, malonic acid, lactic acid, citric acid, tartaric acid, oxalic acid, ascorbic acid, benzoic acid, salicylic acid, pyruvic acid, phthalic acid, carbonic acid, formic acid, methanesulfonic acid, ethanesulfonic acid, camphoric acid, gluconic acid, L- and D-glutamic acid, trifluoroacetic acid, ranelic acid, 2,3,5,6-tetrabromobenzoic acid, 2,3,5,6-tetrachlorobenzoic acid, 2,3,6-tribromobenzoic acid, 2,3,6-trichlorobenzoic acid, 2,4-dichlorobenzoic acid, 2,4-dihydroxybenzoic acid, 2,6-dinitrobenzoic acid, 3,4-dimethoxybenzoic acid, abietic acid, acetoacetic acid, acetonedicarboxylic acid, aconitic acid, acrylic acid, adipic acid, alpha-ketoglutamic acid, anthranilic acid, benzilic acid, arachidic acid, azelaic acid, behenic acid, benzenesulfonic acid, beta-hydroxybutyric acid, brassidic acid, capric acid, chloroacrylic acid, cinnamic acid, citraconic acid, crotonic acid, cyclopentane-1,2-dicarboxylic acid, cyclopentanecarboxylic acid, cystathionine, decanoic acid, erucic acid, ethylenediaminetetraacetic acid, fulvic acid, fumaric acid, gallic acid, glutaconic acid, glutamic acid, gulonic acid, heptanoic acid, hexanoic acid, humic acid, hydroxystearic acid, isophthalic acid, itaconic acid, lanthionine, lauric acid (dodecanoic acid), levulinic acid, linoleic acid (cis,cis-9,12-octadecadienoic acid), malic acid, m-chlorobenzoic acid, melissic acid, mesaconic acid, methacrylic acid, monochloroacetic acid, myristic acid, (tetradecanoic acid), nonanoic acid, norvaline, octanoic acid, oleic acid (cis-9-octadecenoic acid), ornithine, oxaloacetic acid, palmitic acid (hexadecanoic acid), p-aminobenzoic acid, p-chlorobenzoic acid, petroselic acid, phenylacetic acid, p-hydroxybenzoic acid, pimelic acid, propiolic acid, propionic acid, p-tert-butylbenzoic acid, p-toluenesulfonic acid, pyruvic acid, sarcosine, sebacic acid, serine, sorbic acid, stearic acid (octadecanoic acid), suberic acid, succinic acid, terephthalic acid, tetrolic acid, threonine, thyronine, tricarballylic acid, trichloroacetic acid, trimellitic acid, trimesic acid, tyrosine, ulmic acid and cyclohexanecarboxylic acid.

The type and concentration of the strontium additive present in the electrochemical cell or battery may be selected in order to optimize one or more physical and/or performance properties of the electrochemical cell (or battery) of the present disclosure. For example, in one or more embodiments, the concentration of the strontium additive in the electrolyte may be in the range of from about 0.001% to about 20% by weight based on the total weight of the electrolyte, such as from about 0.001% to about 15% by weight based on the total weight of the electrolyte, or from about 0.001% to about 10% by weight based on the total weight of the electrolyte, or from about 0.01% to about 10% by weight based on the total weight of the electrolyte, or from about 1% to about 10% by weight based on the total weight of the electrolyte.

In some embodiments, the strontium additive may be used in combination (or optionally replaced) with another compound capable of reacting with solid lithium sulfide and lithium polysulfide such that a soluble sulfide species is formed. For example, such compounds may include compounds in which the strontium is replaced by another suitable element Y that will react with solid lithium sulfide and lithium polysulfide to form a soluble $YS_z$ species, where z is an integer in the range of from 1 to about 10, such as 1 to about 6, or 1 to about 4. In some embodiments, Y may be a metal, such as an alkaline earth metal, or any element capable of forming a soluble $YS_z$ species upon reaction with solid lithium sulfide and lithium polysulfide.

The battery or electrochemical cell or the present disclosure may further include a non-aqueous, ionically conductive electrolyte, which serves as a path for migration of ions between the anode and the cathode electrodes during electrochemical reactions of the cell. The electrolyte may be in either liquid state or solid state, or both. The electrochemical reaction at the electrodes involves conversions of ions in atomic or molecular forms that migrate from the anode to the cathode. In some embodiments, the components of the non-aqueous electrolytes may be substantially chemically inert to the anode and cathode materials. Furthermore, an electrolyte in liquid state may exhibit physical properties that are beneficial for ionic transport (e.g., low viscosity, low surface tension, and/or good wettability).

The various components of the electrolyte may be selected from among those generally known in the art, which are suitable for use in combination with the anode, cathode, and strontium additive materials detailed elsewhere herein. In embodiments, the electrolyte may have an inorganic, ionically conductive salt dissolved in a non-aqueous solvent (or solvent system, when a mixture of solvents is used). The electrolyte may include an ionizable alkali metal salt dissolved in an aprotic organic solvent or a mixture of solvents comprising a low viscosity solvent and a high permittivity solvent. The inorganic, ionically conductive salt may serve as the vehicle for migration of the anode ions to react with the cathode active material. In embodiments, the ion-forming alkali metal salt may be similar to the lithium comprising the anode.

The electrolyte may include any material suitable for lithium-sulfur battery operation. In some embodiments, the electrolyte is a non-aqueous solution (e.g., an organic electrolytic solution). In some embodiments, the electrolyte may include one or more non-aqueous solvent and a salt that is at least partially dissolved in the solvent. The solvent may include an organic solvent such as a polycarbonate and/or ether or mixtures thereof. In some embodiments, the solvent may include includes 1 M $LiN(CF_3SO_2)_2$ dissolved in an aprotic solvent mixture, such as a 1:1 by weight of a mixture of diethylene glycol methyl ether, and, 1,3 dioxalane. As discussed above, salts suitable for use with various embodiments of the present disclosure include one or more lithium salts, such as, for example, one or more lithium salts selected from $LiPF_6$, $LiSbF_6$, $LiBF_4$, LiTFSI, LiFSI, $LiAlCl_4$, $LiAsF_6$, $LiClO_4$, $LiGaCl_4$, $LiC(SO_2CF_3)_3$, $LiN(CF_3SO_2)_2$, $Li(CF_3SO_3)$, and $LiB(C_6H_4O_2)_2$.

Low-viscosity solvents (for example, organic solvents) that may be used in the battery or electrochemical cell may include, for example: dioxlane (DOL), dimethyl carbonate (DMC); diethyl carbonate (DEC); 1,2-dimethoxyethane (DME); tetrahydrofuran (THF); methyl acetate (MA); a member of the family of glycol ethers, such as, for example, diglyme (DGL), triglyme, and/or tetraglyme; and high permittivity solvents, including, for example, cyclic carbonates, cyclic esters, and cyclic amides (such as propylene carbonate (PC), ethylene carbonate (EC), acetonitrile, dimethyl sulfoxide (DMS), dimethyl formamide, dimethyl acetamide, gamma-butyrolactone (GBL), and N-methyl-pyrrolidinone (NMP), as well as various mixtures or combinations thereof.

The type and composition of the solvent used in the electrolyte, and/or the type and concentration of a salt present therein, may be selected in order to optimize one or more physical and/or performance properties of the electrochemical cell of the present disclosure. For example, in one or more embodiments, the concentration of the salt in the electrolyte may be in the range of from about 0.5M to about 2.5M, from about 0.75M to about 2.25M, or from about 1M to about 2M. In embodiments where a mixed solvent system is employed, the ratio (by volume) may range, for example, from between about 1:9 and about 9:1 of a first solvent (e.g., a carbonate solvent, such as propylene carbonate) and a second solvent (e.g., a substituted alkane solvent, such as 1,2-dimethoxylethane); that is, the solvent system may comprises from about 10 volume % to about 90 volume %, from about 20 volume % to about 80 volume %, or from about 30 volume % to about 70 volume %, of a first solvent, all or substantially all of the balance of the solvent system being the second solvent.

In some embodiments, separator 106 may include a strontium additive and/or an inorganic additive (optionally in addition to the strontium additive), and/or a surface-functionalized carbonaceous material (such as a surface-functionalized carbonaceous material functionalized with amine, and/or amide groups) as a means to mitigate or prevent polysulfides from migrating towards the lithium anode. Exemplary separators 106 may include a polymeric material and/or a surface-functionalized carbonaceous material in an amount in the range of from about 1% to about 99.999% by weight based on the total weight of the separator, or about 20% to about 95% by weight based on the total weight of the separator, or about 50% to about 95% by weight based on the total weight of the separator, and include an additive, such as a strontium additive (or a strontium additive and/or a inorganic additive) in an amount of from about 0.001% to about 99% by weight based on the total weight of the separator, or about 1% to about 80% by weight based on the total weight of the separator, or about 5% to about 50% by weight based on the total weight of the separator.

In some embodiments, the battery or electrochemical cell of the present disclosure may additionally comprise a separator that is selected to separate the sulfur cathode/cathode material from the lithium anode/anode material, such as to prevent internal short circuit conditions. In some embodiments, the separator may be a surface-functionalized carbonaceous material that may be functionalized with chemical moieties (such as amines and/or amides) that are able to generate weak bonds (for example, hydrogen bonding and van der Waals forces) with polysulfides, and/or selected from materials known in the art, such as those that are electrically insulating (and sometimes ionically conductive), chemically non-reactive with the anode and cathode active materials, and both chemically non-reactive with and insoluble in the electrolyte. In addition, the separator material may be selected such that it may have a degree of porosity sufficient to allow flow through of the electrolyte during the electrochemical reaction of the cell. Finally, the separator material may be selected to have any desired thickness, such as a thickness ranging from, for example, about 15 microns to about 75 microns, or about 20 microns to about 40 microns.

Further, suitable separator materials may include, or may be selected from, porous or nonporous polymer membranes, such as for example: polypropylene, polyethylene, polyamide (e.g., nylon), polysulfone, polyvinyl chloride (PVC), and similar materials, and combinations thereof (e.g., a trilayer membrane, such as a trilayer membrane of polypropylene/polyethylene/polypropylene), as well as fabrics woven from fluoropolymeric fibers, including for example polyvinylidine fluoride (PVDF), polyvinylidine fluoride-cohydrofluorpropylene (PVDF-HFP), tetrafluoroethylene-ethylene copolymer (PETFE), chlorotrifluoroethylene-ethylene copolymer, and combinations thereof. Fabrics woven from these fluoropolymeric fibers may be used either alone or laminated a microporous film (e.g., a fluoropolymeric microporous film).

In some embodiments, the lithium-sulfur battery (or lithium-sulfur electrochemical cell) of the present disclosure further comprises a separator containing surface-functionalized carbonaceous materials as means to further mitigate or prevent polysulfides from migrating towards the lithium anode. For example, the surface-functionalized carbonaceous materials may be a component of the separator that is present between the electrodes and is structured in a manner that allows the polysulfides to permeate the separator and interact with the surface-functionalized carbonaceous materials such that the polysulfides are precluded from contacting the anode.

In some embodiments, the separator may be prepared with the strontium additive incorporated therein, such that the strontium additive may be released from the separator upon exposing the battery to a predetermined condition (such as the rupturing of a temporary barrier incorporated in the battery. For example, in some embodiments, the separator may be prepared by dispersing a strontium additive, such as $SrI_2$, into one or more polymers, such as polyvinylidene fluoride (PVDF), polyvinylidene fluoride-co-hexafluoropropylene (PVDF-HFP), polyethylene (PE), polypropylene (PP), or similar polymers.

In some embodiments, the cathode (or anode) further may include a separator attached thereto, where the separator attached to the cathode (or attached to the anode) comprises a polymeric material, such as a polymeric material comprising a strontium additive, and/or surface-functionalized carbonaceous materials to further reduce the diffusion of polysulfides toward the anode, such as to further reduce the diffusion of polysulfides that might otherwise migrate to the lithium-comprising-anode and passivate the lithium-comprising-anode.

In embodiments, the separator made from, for example, the above-mentioned separator materials and/or polymers, such as, surface-functionalized carbonaceous materials, polyvinylidene fluoride (PVDF), polyvinylidene fluoride-co-hexafluoropropylene (PVDF-HFP), polyethylene (PE), polypropylene (PP), or similar polymers and may also comprise one or more inorganic additives, such as clays or organically modified clays (for example, clays including cationically or anionically or chemically modified surface functional group(s)).

In some embodiments, the cathode for use in lithium-sulfur batteries may include sulfur and a separator, where the separator includes a surface-functionalized carbonaceous materials. In some embodiments, the cathode and/or the separator may further comprise a surface-functionalized carbonaceous material (such as carbonaceous materials functionalized on the surface with amine, and/or amide groups); and polymeric materials (such as polyamide material), to further reduce the diffusion of polysulfides towards the anode. The cathode may also include a binder, for example, a polymeric binder such as polytetrafluoroethylene (PTFE) or polyvinylidene fluoride (PVDF). Additionally, carbon materials such as carbon black, synthetic graphite including expanded graphite, graphite nanosheets, graphite nanoplatelet, graphene sheets, non-synthetic graphite (including natural graphite and coke) and graphitized carbon nano-fibers, may be used as either conductive fillers in the cathodes and/or materials that can be surface-functionalized (such as with amine, and/or amide groups by known methods) to form surface-functionalized carbonaceous materials.

In some embodiments, a layer containing the surface-functionalized carbonaceous materials may be included in a location other than, or in addition to, the separator to further mitigate or prevent polysulfides from migrating towards the lithium anode. For example, the layer containing the surface-functionalized carbonaceous materials may be a component of the anode, the separator, and/or the cathode; or the layer containing the surface-functionalized carbonaceous materials may be disposed between the anode and the cathode, such as between the anode and the separator and/or between the separator and the cathode. The layer containing the surface-functionalized carbonaceous materials may be structured so that functional groups of polysulfides interact with the surface-functionalized materials such that the polysulfides are precluded from contacting the anode.

In embodiments, the layer may include the surface-functionalized carbonaceous material according to the present disclosure. In embodiments, the layer may include the surface-functionalized carbonaceous material in an amount in the range of from about 0.001% to about 90% by weight based on the total weight of the layer, or from about 1% to about 70% by weight based on the total weight of the separator, or from about 5% to about 50% by weight based on the total weight of the separator, or from about 5% to about 30% by weight based on the total weight of the separator. The layer containing the surface-functionalized carbonaceous material according to embodiments of the present disclosure may have a thickness in the range of from about 1 μm to about 250 μm, or from about 5 μm to about 200 μm, or from about 10 μm to about 100 μm.

A form or configuration of the electrochemical cell may generally be selected from those known in the art. In embodiments, the form or configuration of the electrochemical cell may be a case-negative design, wherein the cathode/anode/separator/electrolyte components are enclosed in a conductive metal casing such that the casing may be connected to the anode current collector in a case-negative configuration, although case-neutral design may also be suitable. A material for the casing may be titanium, although stainless steel, nickel, and aluminum are also suitable. The casing header may comprise a metallic lid having a sufficient number of openings to accommodate the glass-to-metal seal/terminal pin feed through for the cathode electrode. The anode electrode may be connected to the case. An additional opening may be provided for electrolyte filling. The casing header may comprise elements that are compatible with the other components of the electrochemical cell and is resistant to corrosion. The cell may thereafter be filled with the electrolyte solution described hereinabove and hermetically sealed, such as by welding a stainless steel plug over the fill hole. The cell may alternatively be constructed in a case-positive design.

For example, in some embodiments, such an electrochemical cell may be a lithium-sulfur battery, comprising: an anode including at least one lithium-based anode active material; a cathode including at least one sulfur-based cathode active material; a separator interposed between the cathode and the anode to separate the cathode and the anode from each other; and an organic electrolytic solution comprising: a lithium salt, and an organic solvent; wherein the separator and/or the organic electrolytic solution include a strontium additive. In some embodiments, an amount of the strontium additive may be in a range of from about 0.01% to about 25% by weight based on the weight of the organic electrolytic solution. In some embodiments, the strontium additive may be $SrI_2$. In some embodiments, the lithium-sulfur battery may further comprise a surface-functionalized carbonaceous material as described above in any of the configurations described in the present disclosure.

For example, in some embodiments, such an electrochemical cell may be a lithium-sulfur battery, comprising: an anode including at least one lithium-based anode active material; a cathode including at least one sulfur-based cathode active material; a separator interposed between the cathode and the anode to separate the cathode and the anode from each other; an organic electrolytic solution; and a surface-functionalized carbonaceous material as described above in any of the configurations described in the present disclosure. For example, the layer containing the surface-functionalized carbonaceous materials may be located between the anode and the separator and/or between the separator and the cathode. In embodiments, the layer containing the surface-functionalized carbonaceous materials may be located between the separator and the cathode, such as at distance that is closer to the cathode than to the separator. In other embodiments, the layer containing the surface-functionalized carbonaceous material may be located on a surface of the anode and/or a surface of the separator, and/or a surface of the cathode. In embodiments, the layer containing the surface-functionalized carbonaceous material may be laminated onto the surface of the separator and/or an electrode, or may be a free-standing sheet disposed between the anode and the cathode, such as between the anode and the separator and/or between the separator and the cathode, or between the separator and the cathode.

In some embodiments, a battery of the present disclosure includes an anode containing lithium, a cathode containing sulfur, and an electrolyte containing a strontium additive physically separated from the electrodes by a barrier. The barrier may be capable of being ruptured or otherwise broken prior to battery use to allow the electrolyte, such as an electrolyte containing a strontium additive, to contact the electrodes. In embodiments, the use of such a barrier increases the storage life of the battery, such as by a duration in the range of from about 1% to about 60%, or in the range of from about 1% to about 40%.

In some embodiments, a barrier (e.g., and electrolyte barrier) may be used to provide a separation between the electrolyte and at least one of the anode and the cathode to thereby improve the stability and shelf life of the battery. For example, the non-aqueous electrochemical cell of the present disclosure may be configured as a reserve battery or cell, whereby the non-aqueous electrolyte, such as a non-aqueous electrolyte comprising a strontium additive, is maintained separately from the electrodes, increasing the useful storage period of the battery over a wide temperature range. When needed, the non-aqueous electrolyte and electrodes may be brought into contact, allowing the battery to function in a normal manner.

Because of the relatively benign nature of the electrolyte solvents and salts suitable for lithium-sulfur batteries, a large variety of mechanisms and materials are available for use as an electrolyte barrier. In embodiments, the barrier material is deformable and may include materials such as metal(s) and/or plastics(s) to form various known configurations suitable for use with exemplary reserve batteries.

The batteries of the present disclosure, both with and without reserve design, possess the performance to be useful in many applications. The batteries may be used for military applications, with sufficient power density to replace currently used lithium-alloy/iron disulfide thermal batteries, and sufficient energy to replace currently used lithium/sulfur dioxide primary batteries.

Sulfur utilization of the electrochemical cells and batteries of the present disclosure varies with the discharge current applied to the cell, among other things. Typically, secondary cells of the present disclosure will cycle at least about 200 times, such as in the range of from about 35 times to about 200 times, or in the range of from about 50 times to about 100 times, with each cycle having a sulfur utilization (measure as a fraction of 1675 mAh/g sulfur output during the discharge phase of the cycle) of at least about 50% when discharged at a moderately high discharge current.

Conventional cells may show a sharp changes in temperature or voltage at the point of reaching full charge. For example, at the end of charge lithium ion cells show a sharp increase in voltage, as described, by Golovin et al. in J. Electrochem. Soc., 1992, vol. 139, pp. 5 10. In some embodiments, the electrochemical cells of the present disclosure comprising strontium additive exhibit a voltage profile upon charge at constant current that shows a sharp increase in voltage as the cell reaches full capacity. The rapid increase in voltage as the cell reaches full capacity in the electrochemical cells of the present disclosure may be used to terminate the charging process. For example, at a predetermined voltage within this region of rapid increase in voltage the charging process can be terminated.

In one method of the present invention, a lithium-sulfur electrochemical cell is charged by (a) supplying electric energy at constant current; (b) monitoring voltage during the charging; and (c) terminating the charge when the monitored voltage is in the range of about 2.4 volts to about 3.0 volts. In some embodiments, the charge may be terminated when the monitored voltage is in the range of about 2.4 volts to about 2.6 volts. In some embodiments, the termination voltage may be in the range of from about 2.1 volts to about 1.0 volts. In some embodiments, charging may be performed by supplying constant current so as to charge the cell in about 1 to 6 hours. In some embodiments, the currents may be in a range of from about 200 mA to about 1200 mA, or about 0.24 $mA/cm^2$ to about 1.44 $mA/cm^2$. The supply of constant current may be provided with an accuracy suitable as selected by one skilled in the art. Voltage may be monitored in the monitoring step at intervals varying from about 10 seconds to less than about 1 second, depending among other things, for example, on the magnitude of the current and the length of charge. In some embodiments, an electrochemical cell may be charged at constant current to a predetermined voltage; charging continued at this voltage until the charge current density falls to a value in the range of about 0.025 $mA/cm^2$ to about 0.01 $mA/cm^2$.

In some embodiments, voltage may be used to determine the charge cutoff for charge termination, or a delta voltage/delta time (dV/dt) may also be used. For example, as the charging proceeds dV/dt rapidly increases at full charge, and this point of rapid increase can used with appropriate electronics for charge termination. In some embodiments, a lithium-sulfur electrochemical cell may be charged by (a) supplying electric energy at constant current; (b) monitoring voltage during the charging; (c) calculating the rate of change of voltage with time (dV/dt); and (d) terminating the charge when the value of dV/dt increases by more than 5 times. In some embodiments the charge is terminated when the value of dV/dt increases by more than 10 times.

In some embodiments, the presence of the strontium additive and the surface-functionalized carbonaceous material in the electrochemical cell of the present disclosure may be effective in preventing and/or eliminating solid lithium sulfide and lithium polysulfide and generating species in the electrolyte that allow for a charge profile with a sharp increase in voltage at the point of full charge over a range of concentrations (such as the concentrations discussed above).

It should be understood that various principles of the disclosure have been described in illustrative embodiments. However, many combinations and modifications of the above described formulations, proportions, elements, materials, and components used in the practice of the claimed invention, in addition to those not specifically described, may be varied and particularly adapted to specific environments and operating requirements without departing from those principles. Other variations and modifications of the present disclosure will be apparent to those of ordinary skill in the art, and it is the intent that such variations and modifications be covered by this disclosure.

Further, the description of various embodiments herein makes reference to the accompanying drawing figures, which show the embodiments by way of illustration and not of limitation. While these embodiments are described in sufficient detail to enable those skilled in the art to practice the claimed invention, it should be understood that other embodiments may be realized and that logical and mechanical changes (e.g., electrolyte compositions, electrochemical cell components and configurations, etc.) may be made without departing from the spirit and scope of the claimed invention. Thus, the disclosure herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Additionally, functional blocks of the block diagrams and flowchart illustrations provided herein support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, may be implemented by either special purpose hardware-based electronics and/or computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the claimed invention. The scope of the claimed invention is accordingly to be limited by nothing other than the claims that may be included in an application that claims the benefit of the present application, in which reference to an element in the singular is not intended to mean "one and only one" unless explicitly so stated, but rather "one or more." Moreover, where a phrase similar to "at least one of A, B, and C" may be used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Although certain embodiments may have been described as a method, it is contemplated that the method may be embodied as computer program instructions on a tangible computer-readable carrier and/or medium, such as a magnetic or optical memory or a magnetic or optical disk. All structural, chemical, and functional equivalents to the elements of the above-described embodiments that are known to those of ordinary skill in the art are contemplated within the scope of this disclosure.

The following examples describe a process of manufacturing an electrochemical cell according to various embodiments. These are several illustrations among numerous varieties. Therefore, these examples do not in any way limit the content of the present disclosure.

EXAMPLES

Electrochemical Testing was carried out on LiS test cells with sulfur containing cathode (with and aluminum substrate, conductive carbon and PVDF) of about 220 μm, a trilayer separator (with outer polypropylene layers and an inner polyethylene layer) of about 25 μm, and a lithium metal anode of about 162 μm. The cells were assembled as shown in FIG. 1.

Figure 2:
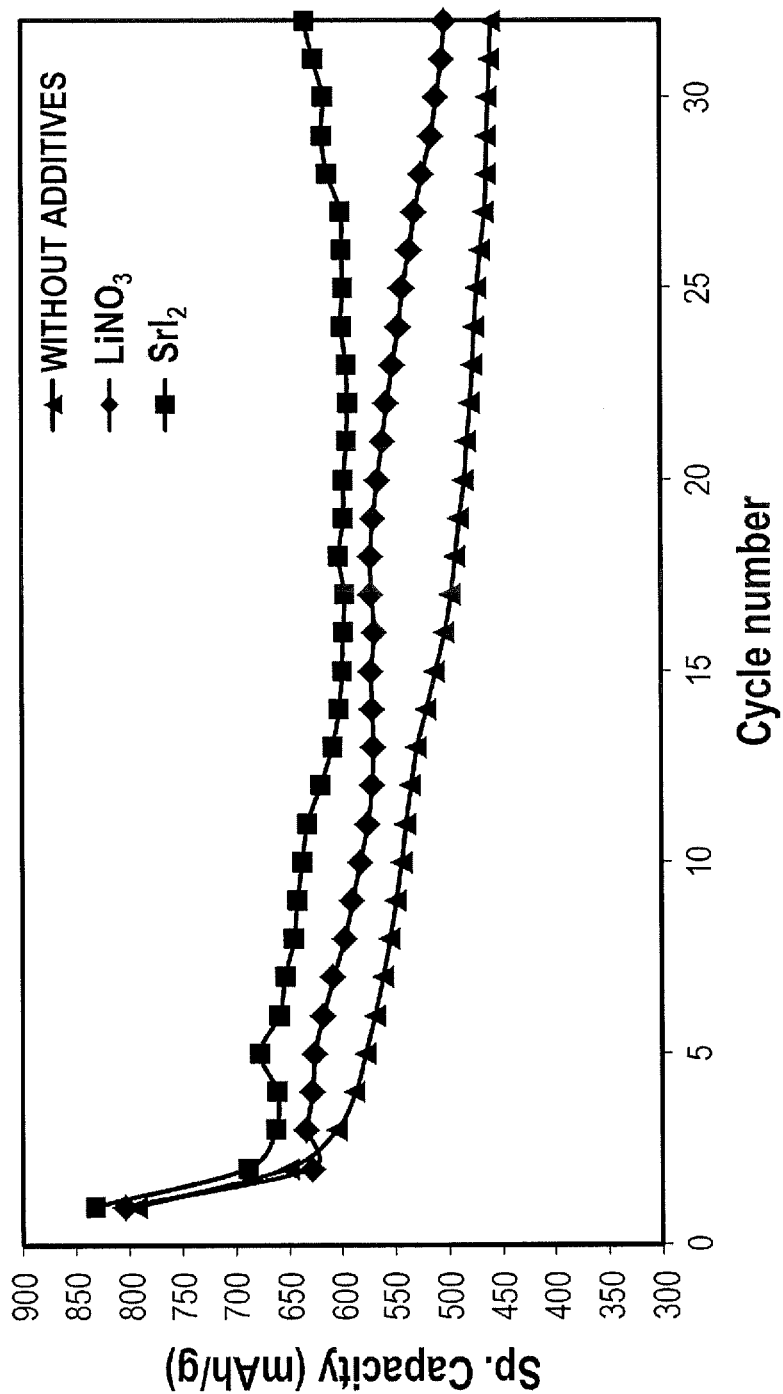
FIG. 2 illustrates the cycling performance of lithium-sulfur electrochemical cells with or without a strontium additive.

The cycling performance was assess with a (1-no additives) baseline electrolyte of 1.0M LiTFSi DOL/DGL (1:1 by volume), (2-LiNO$_3$) the baseline electrolyte including 0.1M LiNO$_3$, and (3-SrI$_2$) the baseline electrolyte including about 5% by weight SrI$_2$. The results of the tests are set forth in FIG. 2, which illustrates the cycling performance of lithium-sulfur electrochemical cells with or without a strontium additive.

Figure 3:
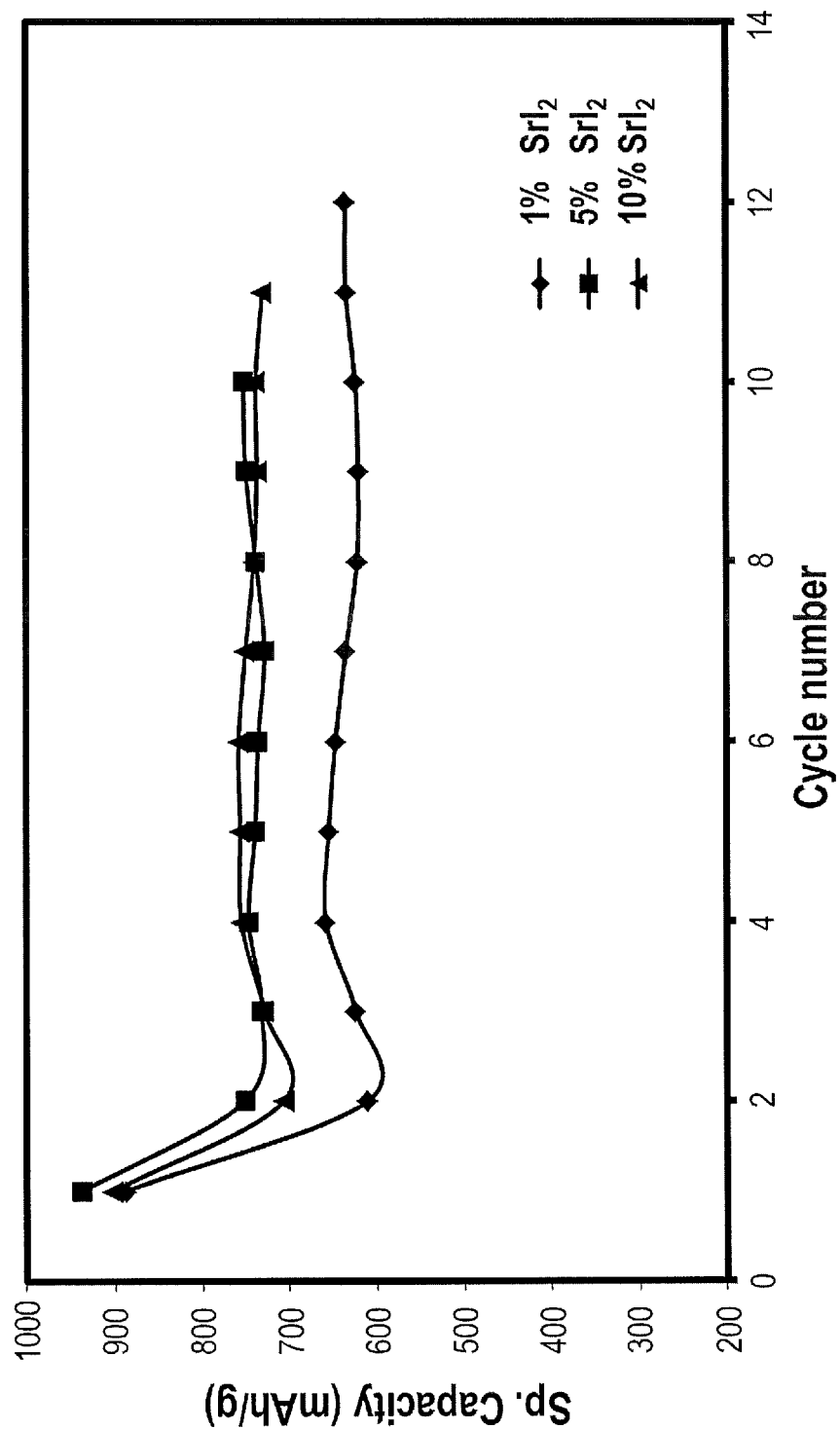
FIG. 3 illustrates the cycling performance of lithium-sulfur electrochemical cells with various concentrations of strontium additives.

The cycling performance was assessed with varying amounts (1%, 5%, and 10% by weight of the baseline electrolyte). The results of the tests are set forth in FIG. 3, which illustrates the cycling performance of lithium-sulfur electrochemical cells with various amounts of strontium additives.

The shelf-life was assessed by storing various cells (including the above test cell components) at room temperature and elevated test temperature of 45° C. for 1 month. The tested cells included (1) the above-identified baseline electrolyte; (2) the above-identified baseline electrolyte including 0.1M LiNO$_3$; (3) the above-identified baseline electrolyte including 5% (v/v) PYR14TFSI (ionic liquid:1-n-Butyl-1-methylpyrrolidinium bis(trifluoromethylsulfonyl)imide), 1% (v/v) HMPA (hexamethylphosphoramide), and 5% (v/v) SrI$_2$/THF (Sample 1 in FIG. 4); or (4) the above-identified baseline electrolyte including 5% (v/v) PYR14TFSI, 1% (v/v) HMPA, and 5% (v/v) SrI$_2$/THF and a NH$_2$-functionalized carbon sheet as an interlayer of approximately 25 μm situated on the cathode having approximately 8% nitrogen content as determined by combustion analysis (Sample 2 in FIG. 4). After storage time, self-discharge of the examples set forth herein was determined by comparing the fresh cell (tested the cell immediately after activation) and after required storage of test time of the 1$^{st}$ discharge capacity at 1.5V. The intermittence discharge was assessed after 3 days at 2.1V. The results are compared with the test data of the fresh cell and are set forth in FIG. 4, which illustrates the shelf-life comparison of lithium-sulfur batteries with the above mentioned electrolytes and configurations.

Figure 4:
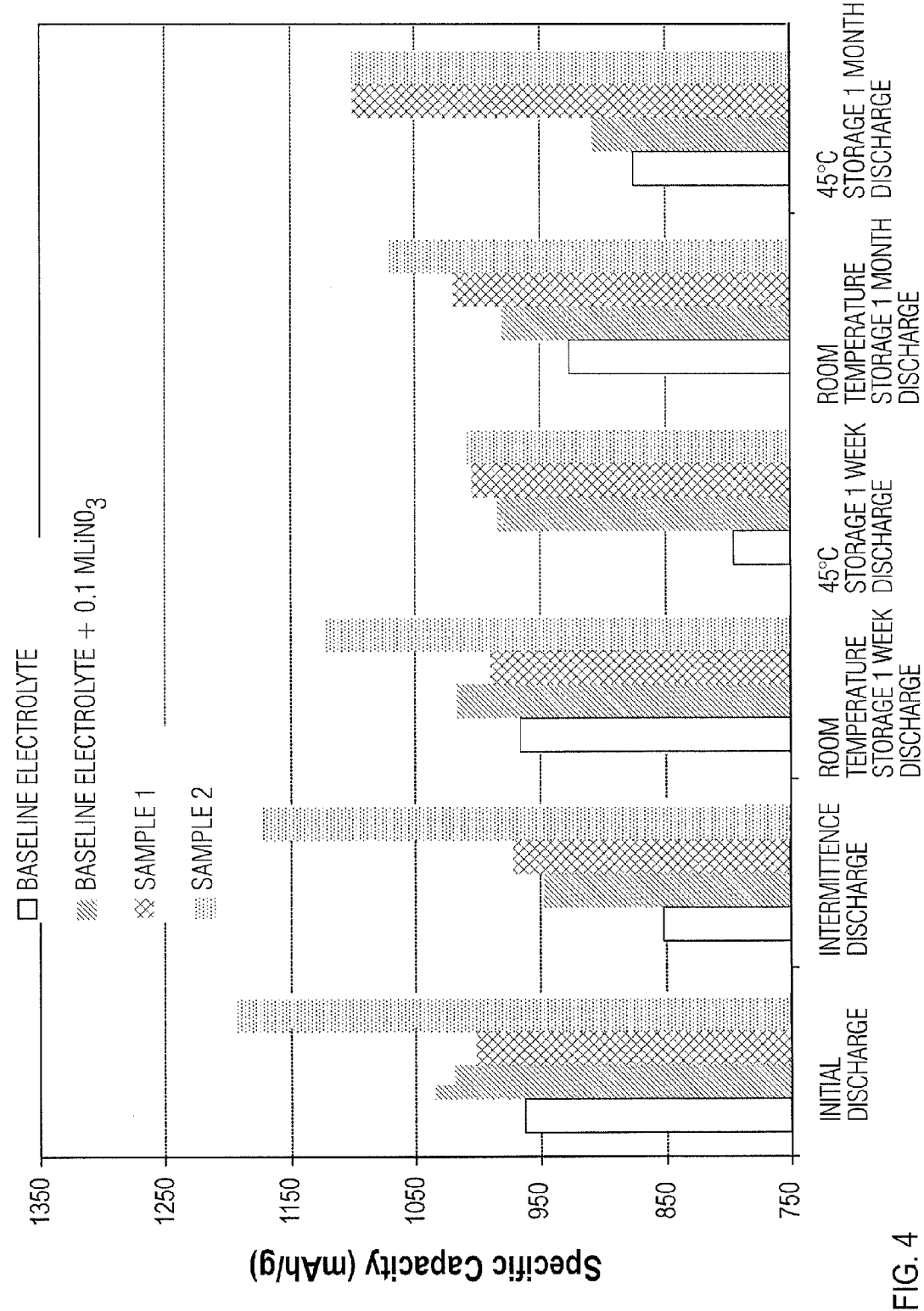
FIG. 4 illustrates a shelf-life comparison of lithium-sulfur batteries with various electrolytes.

The self-discharge percent (battery storage typically leads to a loss of charge retention, often termed self-discharge) may be calculated from the data in FIG. 4. "Self-discharge," as used herein, pertains to the difference between the discharge capacity of a cell at the N$^{th}$ cycle and the discharge capacity at the (N+1)$^{th}$ cycle after a storage period in a charged state:

$$\text{Self-discharge (\%)} = \frac{C^N - C^{N+1}}{C^N} \times 100\%,$$

where $C^N$ is the N$^{th}$ cycle discharge capacity of the cell (mAh) and $C^{N+1}$ is the (N+1)$^{th}$ cycle discharge capacity of the cell (mAh) after a storage period. The data demonstrates that the electrolyte formulation including SrI$_2$, ionic liquid, HMPA, and LiNO$_3$ significantly improve the shelf-life performance (i.e., gains of 1.91% and 9.9%) of the lithium-sulfur battery.

Figure 5:
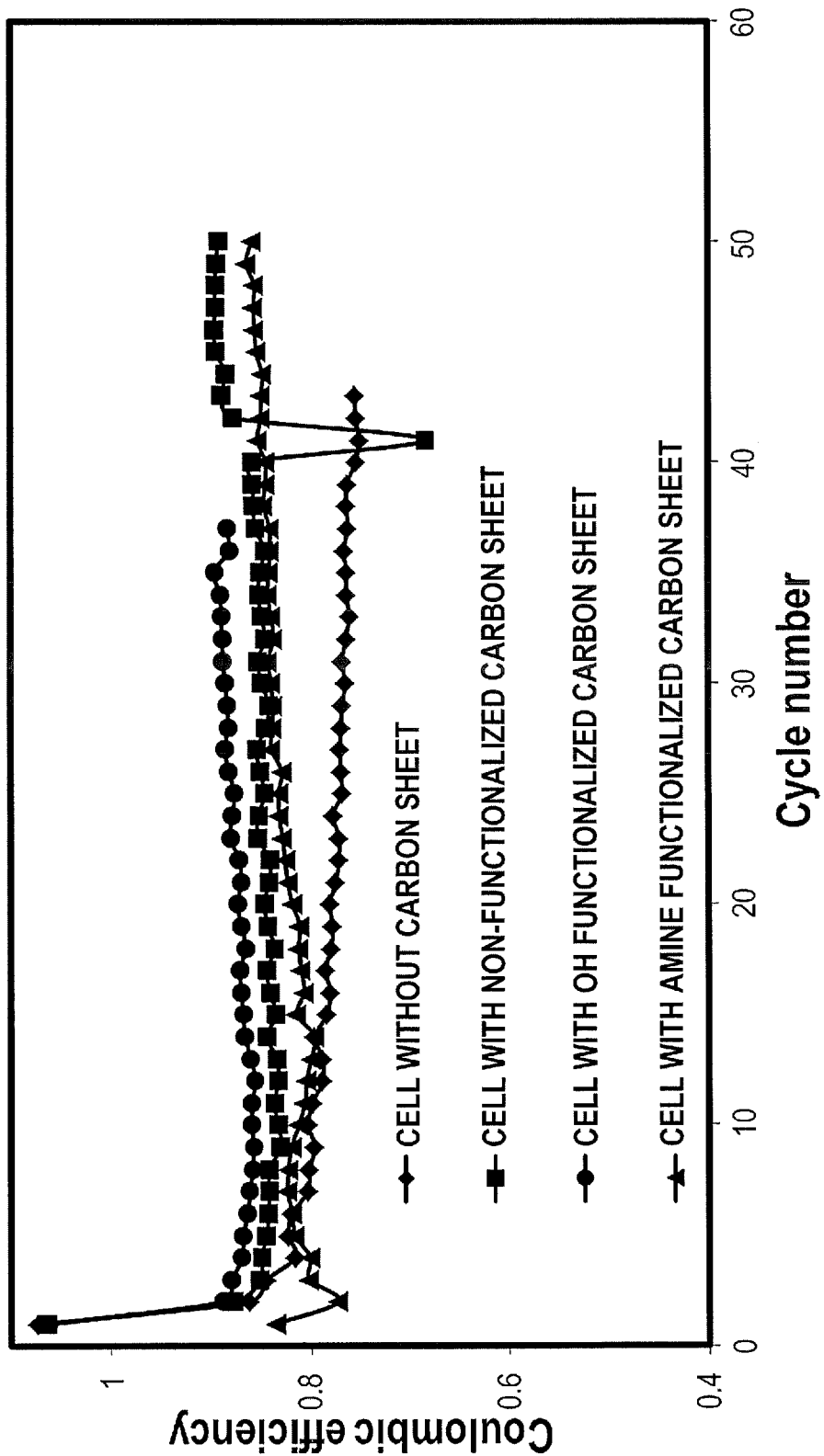
FIG. 5 illustrates the coulombic efficiency of various lithium-sulfur electrochemical cells with and without functionalized carbonaceous sheets.

The coulombic efficiency of various cells with and without surface-functionalized carbonaceous sheets (carbon sheet) was assessed with cells containing (1) the above-identified baseline electrolyte and no carbon sheet; (2) the above-identified baseline electrolyte and a non-functionalized carbonaceous sheet as an interlayer of approximately 25 μm situated on the cathode; (3) the above-identified baseline electrolyte including a carbon sheet functionalized with OH groups as an interlayer of approximately 25 μm situated on the cathode; or (4) the above-identified baseline electrolyte including a carbon sheet functionalized with OH groups as an interlayer of approximately 25 μm situated on the cathode having approximately 8% nitrogen content as determined by combustion analysis. The results of the tests are set forth in FIG. 5, which illustrates the columbic efficiency of various lithium-sulfur electrochemical cells with and without functionalized carbonaceous sheets.

Figure 6:
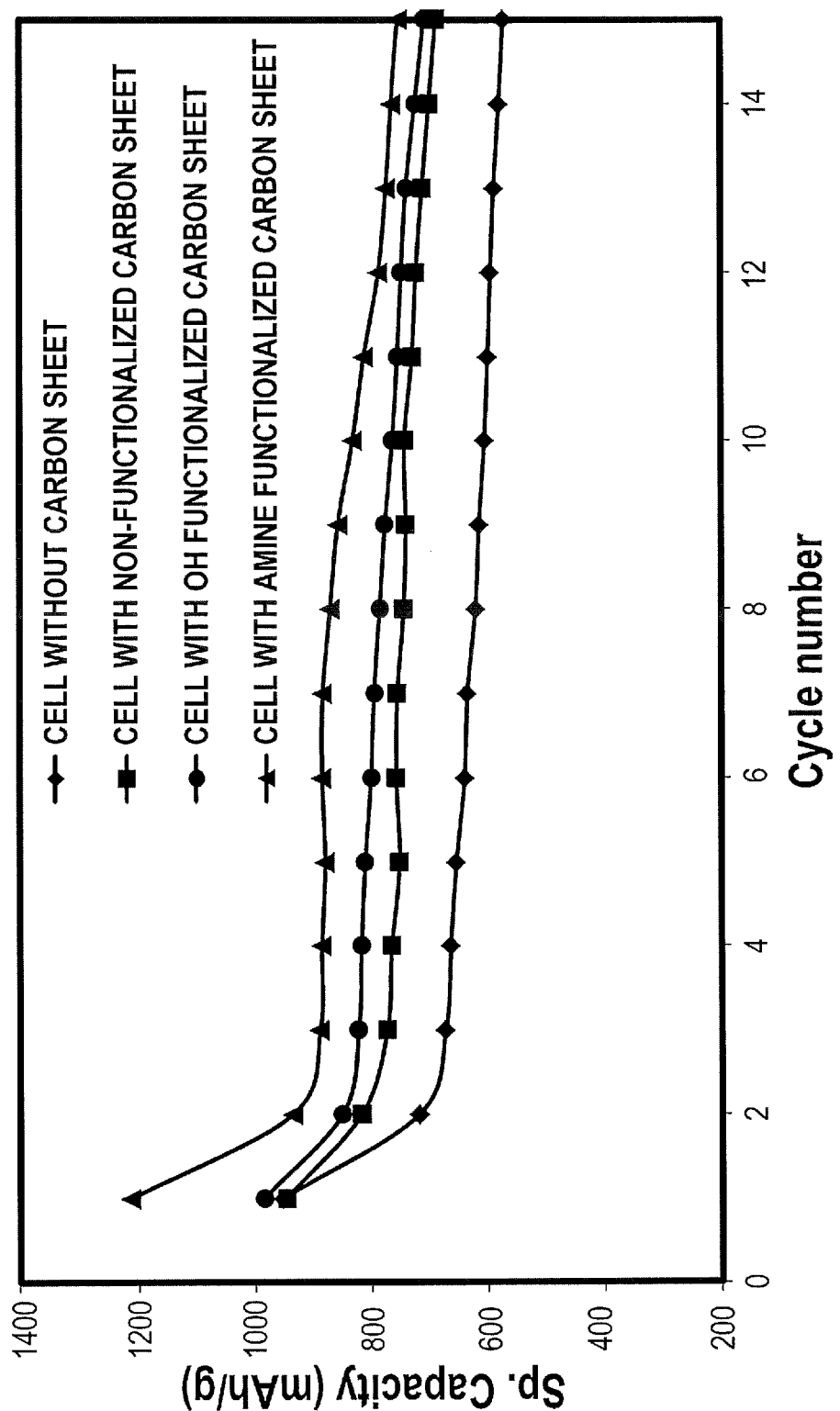
FIG. 6 illustrates the cycling performance of lithium-sulfur electrochemical cells with or without functionalized carbonaceous sheets.

The cycling performance of various cells with and without surface-functionalized carbonaceous sheets (carbon sheet) was assessed with cells containing (1) the above-identified baseline electrolyte and no carbon sheet; (2) the above-identified baseline electrolyte and a non-functionalized carbonaceous sheet as an interlayer of approximately 25 μm situated on the cathode; (3) the above-identified baseline electrolyte including a carbon sheet functionalized with OH groups as an interlayer of approximately 25 μm situated on the cathode; or (4) the above-identified baseline electrolyte including a carbon sheet functionalized with OH groups as an interlayer of approximately 25 μm situated on the cathode having approximately 8% nitrogen content as determined by combustion analysis. The results of the tests are set forth in FIG. 6, which illustrates the cycling performance of lithium-sulfur electrochemical cells with or without functionalized carbonaceous sheets.

Although the present invention is set forth herein in the context of the appended drawing figures, it should be appreciated that the invention is not limited to the specific form shown. For example, while the disclosure is conveniently described in connection with particular strontium additives, electrolytes, polymeric materials, and one or more separator, the present disclosure is not so limited. Furthermore, although the battery is described in connection with specific configurations, the invention is not limited to the illustrated examples. Various modifications, variations, and enhancements in the design and arrangement of the method and apparatus set forth herein, may be made without departing from the spirit and scope of the present disclosure as set forth in the appended claims.

Having described the disclosure in detail above, it will be apparent that modifications and variations are possible without departing from the scope of the disclosure defined in the appended claims.

What is claimed is:
1. A non-aqueous lithium-sulfur electrochemical cell, comprising:
   an anode including an anode material comprising lithium;
   a cathode including a cathode material comprising sulfur;
   a separator disposed between the anode and the cathode;
   a non-aqueous electrolyte which is in fluid communication with the anode, the cathode, and the separator; and
   a layer containing a surface-functionalized carbonaceous material disposed between the anode and the cathode.

2. The lithium-sulfur electrochemical cell of claim 1, wherein the layer has a porosity that allows the electrolyte to flow through the layer.

3. The lithium-sulfur electrochemical cell of claim 1, comprising two or more layers containing the surface-functionalized carbonaceous material, the two or more layers being disposed between the anode and the cathode.

4. The lithium-sulfur electrochemical cell of claim 1, wherein the layer contains the surface-functionalized carbonaceous material in an amount of from 0.001% to 90% by weight based on a total weight of the layer.

5. The lithium-sulfur electrochemical cell of claim 4, wherein the layer contains the surface-functionalized carbonaceous material in an amount of from about 1% to about 70% by weight based on a total weight of the layer.

6. The lithium-sulfur electrochemical cell of claim 1, wherein the layer containing the surface-functionalized carbonaceous material has a thickness of from 5 µm to 200 µm.

7. The lithium-sulfur electrochemical cell of claim 1, wherein the layer containing the surface-functionalized carbonaceous material is disposed between the separator and the cathode.

8. The lithium-sulfur electrochemical cell of claim 7, wherein the layer containing the surface-functionalized carbonaceous material is disposed at a distance from the cathode that is less than a distance between the layer and the separator.

9. The lithium-sulfur electrochemical cell of claim 1, wherein the layer containing the surface-functionalized carbonaceous material is a free-standing sheet.

10. The lithium-sulfur electrochemical cell of claim 9, wherein the free-standing sheet is located between the separator and the cathode.

11. The lithium-sulfur electrochemical cell of claim 1, wherein the surface-functionalized carbonaceous material is located on a surface of the cathode and/or the separator.

12. The lithium-sulfur electrochemical cell of claim 11, wherein the layer containing the surface-functionalized carbonaceous material is located on a surface of the cathode.

13. The lithium-sulfur electrochemical cell of claim 11, wherein the layer containing the surface-functionalized carbonaceous material is located on a surface of the separator interposed between the anode and the cathode.

14. The lithium-sulfur electrochemical cell of claim 1, wherein the surface-functionalized carbonaceous material is a carbonaceous material functionalized with chemical moieties that interact with polysulfide functional groups.

15. The lithium-sulfur electrochemical cell of claim 14, wherein the surface-functionalized carbonaceous material is functionalized in an amount such that the chemical moieties make up 1% to 30% by weight of the surface-functionalized carbonaceous material.

16. The lithium-sulfur electrochemical cell of claim 1, wherein the surface-functionalized carbonaceous material is a carbonaceous material functionalized with amine and/or amide groups.

17. The lithium-sulfur electrochemical cell of claim 1, wherein the cell is a battery.

18. The lithium-sulfur electrochemical cell of claim 1, wherein the cathode material comprises from about 20% to about 95% sulfur by weight based on a total weight of the cathode.

19. The lithium-sulfur electrochemical cell of claim 1, wherein the cathode material is loaded onto a surface of a substrate in an average loading amount in a range of from about 1 to about 40 mg/cm², the cathode material comprising from 0.001% to 70% by weight, based on a total weight of the cathode, of a surface-functionalized carbon material as a conductive additive.

20. The lithium-sulfur electrochemical cell of claim 1, wherein the anode further comprises a metal selected from the group consisting of magnesium, sodium, and potassium.

21. The lithium-sulfur electrochemical cell of claim 1, wherein the anode further comprises one or more members selected from the group consisting of LiMg, LiAl, LiAlMg, LiS, LiB, and LiSB.

22. The lithium-sulfur electrochemical cell of claim 1, wherein the non-aqueous electrolyte comprises one or more organic solvents selected from the group consisting of dimethyl carbonate (DMC), diethyl carbonate, dioxolane (DOL), 1,2-dimethoxyethane (DME), tetrahydrofuran (THF), methyl acetate (MA), diglyme, triglyme, tetraglyme, propylene carbonate (PC), ethylene carbonate (EC), acetonitrile, dimethyl sulfoxide, dimethyl formamide, dimethyl acetamide, gamma-butyrolactone (GBL), and N-methyl-pyrrolidinone (NMP).

23. The non-aqueous lithium-sulfur electrochemical cell of claim 1, wherein the non-aqueous electrolyte comprises two or more organic solvents selected from the group consisting of dimethyl carbonate (DMC), diethyl carbonate, dioxolane (DOL), 1,2-dimethoxyethane (DME), tetrahydrofuran (THF), methyl acetate (MA), diglyme, triglyme, tetraglyme, propylene carbonate (PC), ethylene carbonate (EC), acetonitrile, dimethyl sulfoxide, dimethyl formamide, dimethyl acetamide, gamma-butyrolactone (GBL), and N-methyl-pyrrolidinone (NMP).

24. The non-aqueous lithium-sulfur electrochemical cell of claim 1, wherein the non-aqueous electrolyte comprises a salt having a formula $LiMF_6$ or $LiMF_4$, wherein M is an element selected from the group consisting of phosphorous, arsenic, antimony and boron.

25. The non-aqueous electrochemical cell of claim 24, wherein the salt is one or more member selected from the group consisting of $LiPF_6$, $LiAsF_6$, LiTFSI, LiFSI, $LiSbF_6$, $LiBF_4$, $LiClO_4$, $LiAlCl_4$, $LiGaCl_4$, $LiC(SO_2CF_3)_3$, $LiB(C_6H_4O_2)_2$, $LiN(CF_3SO_2)_2$ and $Li(CF_3SO_3)$.

26. The lithium-sulfur electrochemical cell of claim 19, wherein the cathode material further comprises one or more conductive additive selected from the group consisting of carbon black and graphite.

27. The lithium-sulfur electrochemical cell of claim 1, wherein the non-aqueous electrolyte comprises an ionic liquid of 1-n-butyl-methylpyrrolidinium bis(trifluoromethylsulfonyl)imide (PYR14TFSI).

28. The lithium-sulfur electrochemical cell of claim 27, wherein the non-aqueous electrolyte further comprises one or more organic solvents selected from the group consisting of hexamethylphosphoramide (HMPA) and dimethyl sulfoxide (DMSO).

29. A method of charging a lithium-sulfur electrochemical cell, comprising:
supplying electrical energy to the lithium-sulfur electrochemical cell at a constant current;
monitoring the voltage during charging; and
terminating the charge when the monitored voltage is in a range of about 2.4 volts to about 3.0 volts,
the lithium-sulfur electrochemical cell comprising:
an anode including an anode material comprising lithium;
a cathode including a cathode material comprising sulfur;
a separator disposed between the anode and the cathode;

a non-aqueous electrolyte which is in fluid communication with the anode, the cathode, and the separator; and a layer containing a surface-functionalized carbonaceous material disposed between the anode and the cathode, wherein functional groups of the surface-functionalized carbonaceous material interact with functional groups of polysulfides and slow the rate of migration of the polysulfides.

30. The method of claim 29, wherein the surface-functionalized carbonaceous material is a carbonaceous material functionalized with amine and/or amide groups.

31. The method of claim 29, wherein the layer contains the surface-functionalized carbonaceous material in an amount of from about 0.001% to about 90% by weight of the layer.

32. A method for manufacturing a non-aqueous lithium-sulfur electrochemical cell, comprising:

introducing a surface-functionalized carbonaceous material into the non-aqueous lithium-sulfur electrochemical cell, wherein the surface-functionalized carbonaceous material is a carbonaceous material functionalized with chemical moieties that are capable of interacting with and non-covalently bonding polysulfides to the carbonaceous material.

33. The method of claim 32, wherein the surface-functionalized carbonaceous material is introduced as a free-standing sheet between an anode and a cathode of the non-aqueous lithium-sulfur electrochemical cell.

34. The method of claim 32, wherein the surface-functionalized carbonaceous material is introduced as a free-standing sheet between a separator and a cathode of the non-aqueous lithium-sulfur electrochemical cell.

35. The method of claim 33, wherein introducing the surface-functionalized carbonaceous material comprises laminating the surface-functionalized carbonaceous material to a surface of the cathode.

36. The method of claim 32, wherein the non-aqueous lithium-sulfur electrochemical cell is a battery.

* * * * *